Oct. 27, 1936.   J. P. HEISS ET AL   2,058,586
POWER OPERATED CLUTCH
Filed Oct. 24, 1931   3 Sheets-Sheet 3

Inventors
George C. Carhart
John P. Heiss &
Axel J. Jansson
By Blackmore, Spencer & Flint
Attorneys Patented Oct. 27, 1936

2,058,586

UNITED STATES PATENT OFFICE 2,058,586

POWER-OPERATED CLUTCH

John P. Heiss, George C. Carhart, and Axel J. Jansson, Flint, Mich., assignors to General Motors Corporation, Detroit, Mich., a corporation of Delaware Application October 24, 1931, Serial No. 570,884

10 Claims. (Cl. 192—.01)

This invention relates to the operation of the clutch of a motor vehicle by power.

An object of the invention is to provide mechanism by which the operator of the motor vehicle may at will render active a power device functioning to open the engine clutch under given conditions to facilitate gear changing or to permit coasting.

Other objects and advantages will be understood from the following description.

Accompanying this description are drawings in which—

Fig. 1a is a section through a detail.

Fig. 6 represents a detail in perspective.

Fig. 7 is a somewhat diagrammatic view, for the most part in section, of a modified form.

Figure 1:
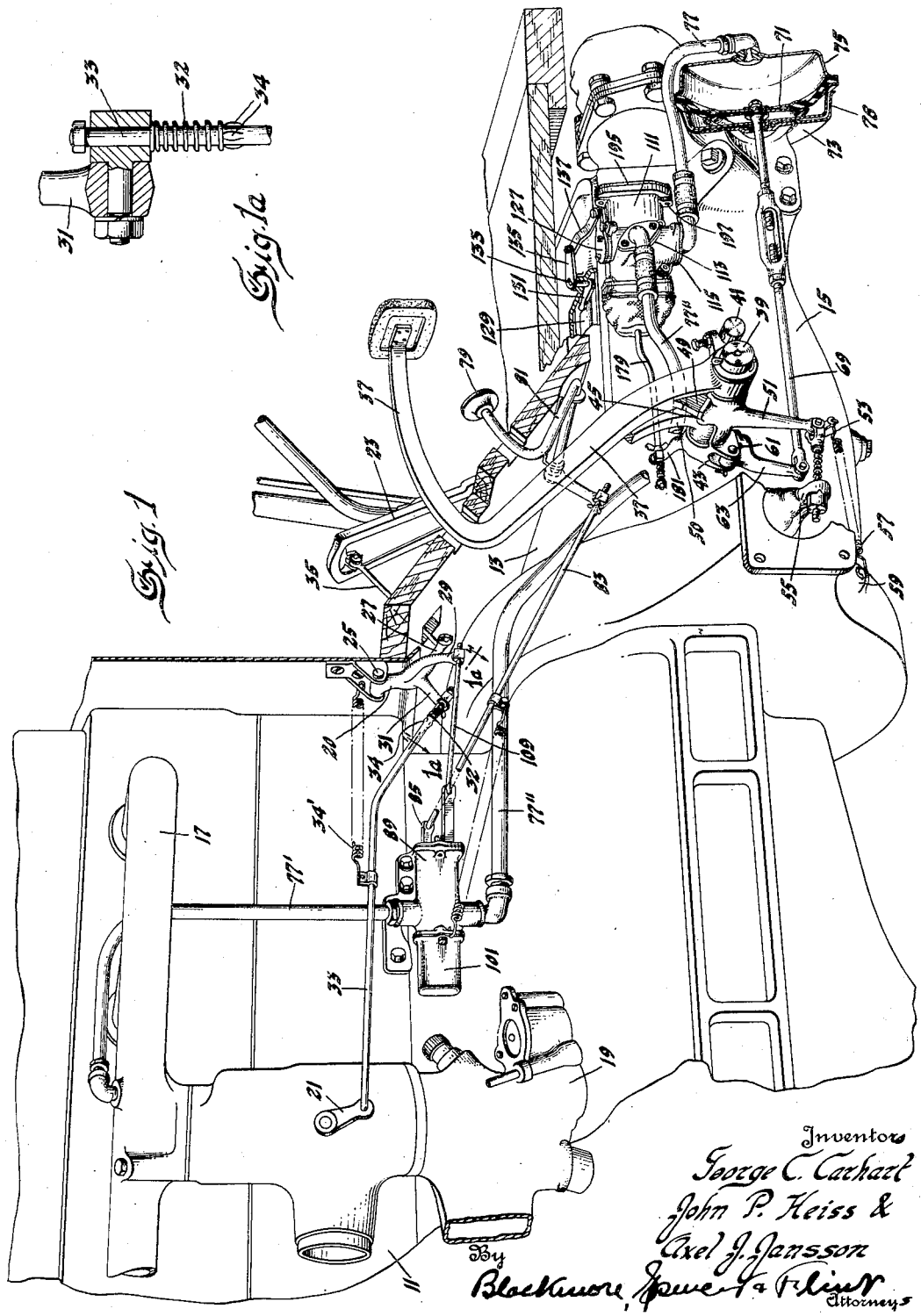
Fig. 1 shows in perspective the invention applied.

On the drawings 11 represents the engine of a motor vehicle and 13 is the clutch housing. 15 represents the housing of the change speed transmission. Associated with the engine is shown an intake manifold 17 and a carburetor 19. Within the header or conduit between the carburetor and the intake manifold is a throttle valve having an external lever arm 21. An accelerator pedal is shown at 23.

A swinging member 20 having three integral arms 27, 29, and 31 rotates about a pivot 25 carried by any suitable bracket on the forward side of the dash. Arm 27 is connected to the accelerator pedal by a link 35. Arm 31 receives slidably the end of a link 33 connected to the throttle lever 21. A spring 32 surrounds the rod 33 and is in abutment with the arm 31 at one end and an enlargement 34 on link 33 at its other end. The tension of the spring is such that it must be initially compressed by the rotation of member 20 with arm 31 before the rod 33 is reciprocated to open the throttle beyond idling position against the tension of the throttle closing spring 34'. The rotation of member 20 is effected by pressure applied manually to accelerator pedal 23 operable through the instrumentality of link 35 upon arm 27. The utility of arm 29 will appear as the description progresses.

At 37 is a clutch pedal loosely mounted on shaft 39. Its inoperative or release movement is limited in any convenient way as by a stop 41. Also rotatable on shaft 39 is a bracket 43 best shown in Fig. 6. The bracket is provided with a surface 45 to be engaged by a surface 49 on the clutch pedal through which engagement and upon the rotation of the pedal the bracket is rotated. The bracket also has an arm 51 connected by a link 53 with suitable mechanism for releasing the clutch of which mechanism the drawings show only the end of a lever 55. A spring 57 attached to a fixed point 59 and also to the end of arm 51 normally holds the bracket in such a position that the clutch springs may hold the clutch plates engaged. It will be seen that the brake pedal 50 is mounted on shaft 39 between the furcations 52, 54 of the bracket 43.

Figure 5:
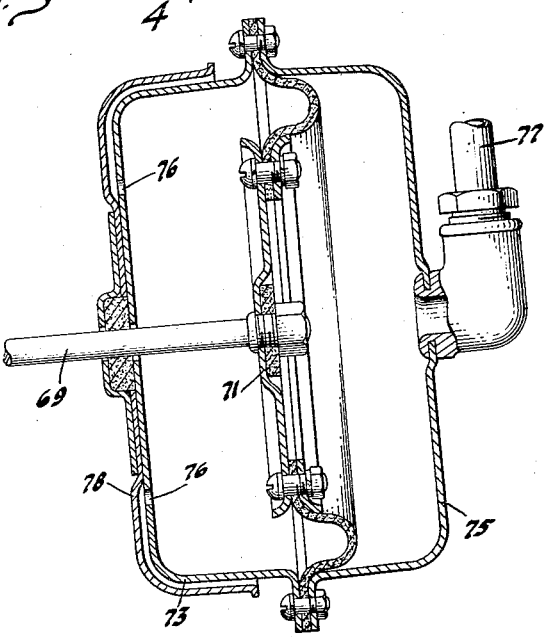
Fig. 5 is a longitudinal section through the power cylinder.

Pivoted to the bracket 43 at 61 is a lever 63 having a surface to engage a cooperating surface 67 on the bracket so that at times the lever 63 and the bracket may rotate as a unit. The end of lever 63 is connected by a rod 69 to the movable element or piston 71 of a power cylinder or a power unit illustrated best in Fig. 5. The piston 71 makes use of a flexible diaphragm clamped peripherally between two cup-shaped members 73 and 75. The piston rod slides freely through an opening in part 73. The portion of the enclosure to the left of the piston is always open to the atmosphere for which openings 76 may be provided beneath a shield 78. A conduit 77 is connected to the power cylinder at the right side of the diaphragm. This conduit, together with extensions 77" and 77' and interposed valves, connects the power cylinder with the intake manifold of the engine. When the passageway through the conduit is uninterrupted and unvented, the suction of the manifold is operable upon the piston of the power unit so that the piston and rod are moved to the right. Such movement is communicated by the rod 69 to the lever 63 and the bracket. The rotation of the bracket operates as is obvious to release the clutch. In so doing the engaging surfaces of the clutch pedal 37 and the bracket separate. As a result, the operation of the clutch by the vacuum power unit does not affect the position of the clutch pedal. It will also be seen that the rotation of the clutch pedal manually may, through the engagement of parts 45 and 49, rotate the bracket 43 and release the clutch. During such movements there occurs a separation of the parts of the lever 63 and bracket which were in engagement in the case of power release of the clutch. As a result the manual operation of the clutch pedal does not cause movement of the parts concerned with the power operating means.

In the conduit between the power cylinder and the manifold are three valves arranged in series. Either one of two of these valves may vent the passage through the conduit to the power unit. When the passage to the power unit is so vented the power unit is obviously inoperative to release the clutch since there can be no pressure difference on the two sides of the diaphragm. The three valves may be designated as a master valve, a control valve (the master valve and the control valve being the two venting valves referred to above) and a selector valve. In the embodiment shown the master valve and the control valve are located in one housing, the master valve being located nearer the manifold. The selector valve is more nearly adjacent the power unit.

The master valve has for its purpose to enable the operator to render the power actuating mechanism operable as a result of the action of the second or control valve which is itself operable automatically and actuated simultaneously with the movements of the accelerator pedal. The function of the selector valve is to predetermine the rate of clutch reengagement, as for example after gear shifting, this rate of reengagement being variable and predetermined for different speed ratios by the act of shifting gears. It may also be variable with successive positions of the clutch plates as they approach operative engagement.

Figure 2:
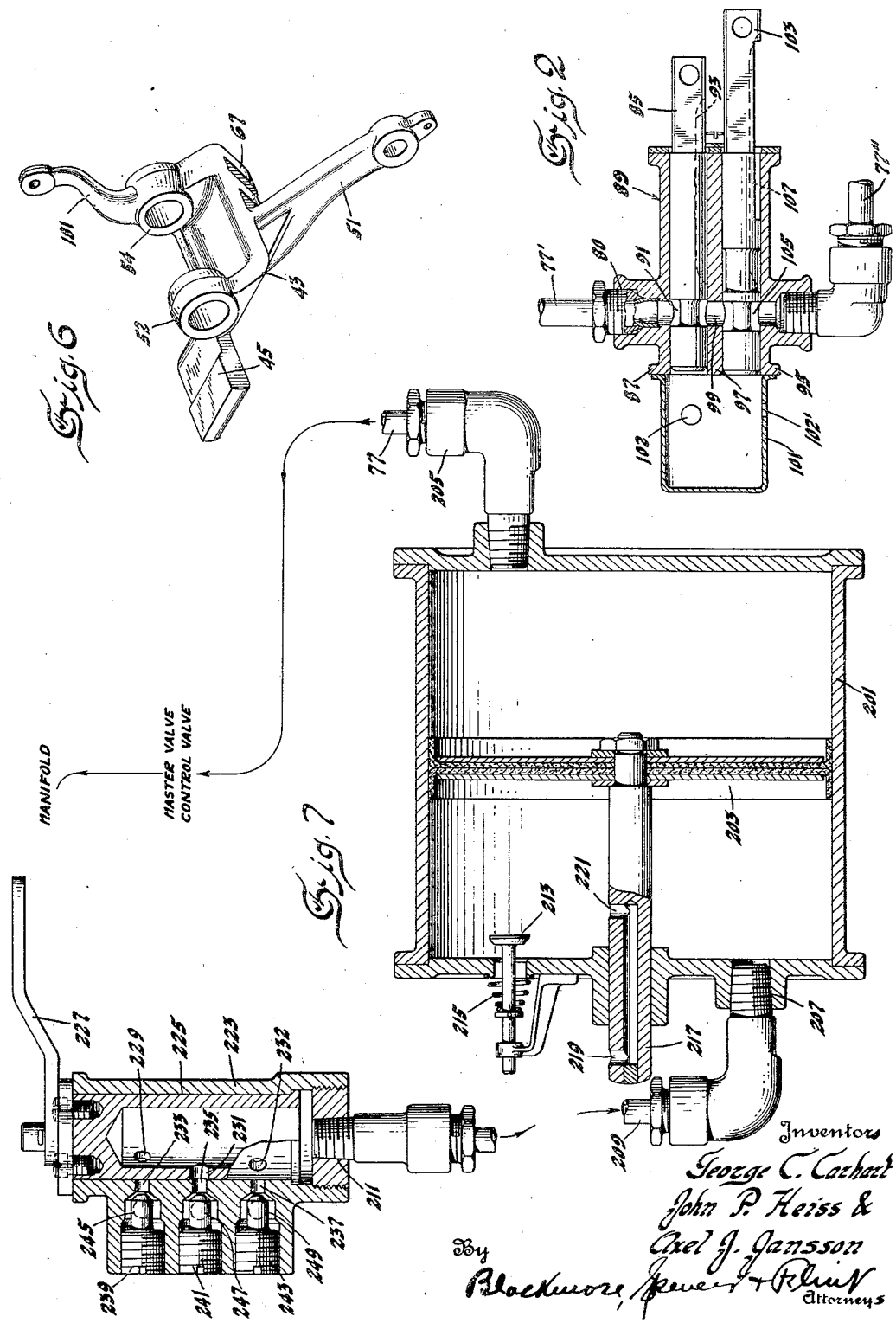
Fig. 2 is a longitudinal section through the combined master and control valves.

At 79 is a knob or abutment projecting from a lever 81 pivoted beneath the toe board, the knob being located just above the toe board and near the clutch pedal. When the car has been started in the usual way and the clutch engaged by the release of manual pressure on the clutch pedal 37, the operator's foot may either rest on the floor as in conventional driving or rest upon and depress the button 79. In the former case where the operator's foot is not on the button 79, the car is operated precisely as usual. The clutch must be released in gear shifting and the engine resists any attempt on the part of the car to coast. In the event that the operator presses his foot upon the button and depresses the same, the car coasts freely whenever the accelerator is not depressed for driving. Moreover gear shifting is effected without the clutch pedal since the control valve is rendered operative by the depression of the button 79 and the clutch is disengaged whenever the pressure on the accelerator pedal is released. The lever 81 which carries the button 79 is connected by a link 83 to a valve rod 85 slidable in an upper cylindrical part 87 of valve body 89. This rod has an annular groove 91 and an elongated recess 93 at one part only of the circumferential surface of the rod. The cylinder 87 has an opening 80 in its wall in which is secured a conduit member 77'. This conduit communicates with the manifold. Cylinder 95, also a part of the valve body 89, is located below the cylinder 87 (more remote from the manifold). It has an opening receiving a second conduit 77''. The wall 97 between the two cylinders has an opening 99 registering with the other openings in the cylinder walls. A cover 101 having a stop 102 and vented at 102' encloses the open ends of the cylinders. In the second and lower cylinder is a similar rod 103 having a groove 105 and on one side a recess 107. This rod 103 is connected by a link 109 to the arm 29 of swinging member 20. Valve rod 85 with its cylinder constitutes the master valve, and rod 103 with its cylinder constitutes the control valve. Fig. 2 shows the master valve in the position which it assumes when the foot is applied to the button. In this position the groove 91 is in registration with the opening 80 and with the passage 99 through the intermediate wall 97 of the valve body member. In this position of the master valve, whenever the remainder of the pipe line between the manifold and the power cylinder is continuous and unvented, the suction of the manifold is operable to open the clutch. The operator has thus rendered it possible for the control valve to perform the function for which it is designed. When the control valve is moved to a position such that the annular groove 105 is in registration with the opening 99, the vacuum of the manifold is effective upon the power cylinder. If, however, the foot of the operator is not pressed upon the button the valve rod 85 is in a position to the left from that shown in Fig. 3. In this last-named position the outlet to pipe 77' is closed by the rod 85 and the recess 93 provides for venting the power unit whenever the control valve 103 is in the position shown by Fig. 2. This is the position of the control valve when the accelerator pedal is released.

With the accelerator pedal released therefore and with the button 79 released, it will be seen that the power cylinder will be in communication with the atmosphere through groove 93 and that under such circumstances the clutch pedal 37 must be depressed to release the clutch. If the accelerator pedal is depressed the valve rod closes the opening 99 through the middle partition and the pipe line 77'' is vented through the groove 107 as will be obvious. As a result of this construction, regardless of the position of the master valve, the power cylinder is vented when the operator depresses the accelerator pedal. When the power cylinder is so vented, the conventional clutch springs effect the engagement of the driving and driven members of the clutch. When, however, the accelerator pedal is released, the groove 105 of the control valve 103 registers with the aligned openings in the walls of the cylinder. If now the master valve is being held in the position shown by Fig. 2 by depressing the button, the suction is operable upon the pipe line to open the clutch. If, however, the foot is not on the button the passage through the cylinder of the master valve to the manifold is closed and the power unit is vented and is incapable of opening the clutch and the operation is precisely as in the now more conventional construction.

It will thus be seen that the car may be operated precisely as usual by keeping the foot off the button which controls the master valve. It will also be seen that if the master valve is moved to the position of Fig. 2 by depression of the button, the clutch is released by manifold vacuum whenever the accelerator pedal is released. Owing to the kind of connection between the lever arm 31 and the link 33 as explained above, the throttle valve reaches its idle position before the control valve reaches the position for evacuating the power cylinder and releasing the clutch. In this way any danger of racing the engine is avoided. It will be apparent that the automatic clutch release upon the removal of the foot from the accelerator pedal permits the car to coast. Also, the resistance of the engine is always available by the mere act of removing the foot from the button 79. For the purpose of gear shifting, since the clutch is simultaneously released upon a removal of the foot from the accelerator pedal, no manual operation of the clutch pedal is required. After gear shifting the clutch closes to operative position when once the accelerator pedal has been depressed to vent the power cylinder.

It has been found that a dashpot action is desirable to control the closing of the clutch and to prevent too sudden an engagement such as would occur were the power unit suddenly vented by the control valve when the accelerator pedal is depressed. There has therefore been provided a selector valve which, in the preferred form, is located in series with the other valves. The selector valve is designed to permit the members of the clutch to come together rather rapidly at first, and then to retard the engagement of the clutch members as the clutch becomes operative. Such a selector valve has been designed to vary the extent of retardation for the different gear ratios of the vehicle transmission. Secured in any convenient manner adjacent the change speed gear box is a valve housing 111 having in one side an opening 113 to receive conduit 77" which is itself connected with the first mentioned valves. The conduit 77, extending from the power cylinder, is connected at opening 114 in a cap 115 secured to the bottom of the valve housing 111 by fastening means 117. A hollow cylindrical valve member 121 is shown as positioned vertically and mounted for axial rotation within the housing 111. Valve member 121 has a ball valve 123 closing an opening in its lower end and the other end, projecting from the top of the housing, has secured thereto by fastening means 125 a lever arm 127. Within the change speed gear box (Fig. 1) is shown the shift rod 129, the reciprocation of which controls gears or clutches for effecting high speed, neutral, and second speed positions. Engaged with the rod is an arm 131 connected to a shaft 133 which also carries an arm 135 outside the gear box. Arm 135 is connected to arm 127 of the selector valve by link 137. It will thus be seen when shifting to and from high and second speeds or into neutral by the use of shift rod 129 the cylindrical valve 121 is rotated to one of three positions of adjustment in accordance with the three positions of adjustment of the shift rod. The hollow valve 121 has a slotted opening 139 in its wall so dimensioned that the interior of the cylinder 121 is always in communication with the opening 113 and the conduit 77". Through the wall of the cylindrical opening of the valve body are three spaced openings 141, 143, and 145. These three openings communicate with the vertical passage 147 in the casing or valve body, and the latter passage 147 communicates with a horizontal passage 149, which latter is open to the outlet 114. The ball valve of the rotating hollow valve member is preferably directly over the outlet 114. The cylindrical wall of the rotary valve has three openings, two of which are represented by numerals 151 and 153, the other not being shown because of the sectional character of the figure. These openings are located so as to register one with each of the openings 141, 143, and 145 as the valve is rotated. Opening 151 is to register with opening 141 when the transmission is positioned for high speed. Openings 153 and 143 are in registration when the shift rod is in neutral, and the third opening in the wall of the cylinder is in registration with the opening 145 in second speed position.

Slidable through the passages 141, 143, and 145 at right angles to the axes of these passages and through bores formed in the valve member are three valve rods 155, 157, and 159. The valve rods are so designed as to variably and partially close the passages through the said openings 141, 143, and 145. To accomplish that purpose the rods are provided with annular grooves 161 near one end. In the clutch-disengaged position these grooves are located in the openings 141, 143, and 145 so that the valve rods do not then materially restrict the flow of air through the passages. The three rods are threaded over three rod extensions 163, 165, and 167, which extensions are provided with heads 169, 171, and 173. A pin 177 connects the several heads together and a link 179 carried by the pin is also connected to a lever arm 181 rigid with the bracket 43. As a result, when the clutch plates approach engagement the valve rods move inwardly toward the right end, the position shown by Fig. 3. It will be remembered that the depression of the accelerator pedal opens the vent provided in the control valve, and it is this venting of the power cylinder which permits the clutch plates to approach engagement under the influence of their springs. The venting is in effect a flow of atmospheric air through the conduit 77', conduit 77" the selector valve, and to the power cylinder. In the selector valve the flow is obviously through that one of the openings which is in communication with the rotary valve, this being determined by the position of the gear shift lever. At the start of the return movement the groove in the valve rod 155, 157, or 159, offers but little restriction to the movement of the piston of the power cylinder and the clutch plates rapidly approach driving contact. As they do so the annular groove 161 moves from the passage (141, 143, or 145 as the case may be) and the restricted part of the rod as at 162 more effectively chokes the passage. The action of the piston is thus slowed down and the clutch plates engage gradually as they approach driving position and grabbing is avoided. When the accelerator pedal is released and the suction of the manifold is operative to withdraw the clutch, the passage through the several openings of the selector valve is, of course, closed by the valve rods. Under these circumstances the direction of flow of the air is reversed and the ball valve opens so that there is quick action in effecting clutch release.

Figure 3:
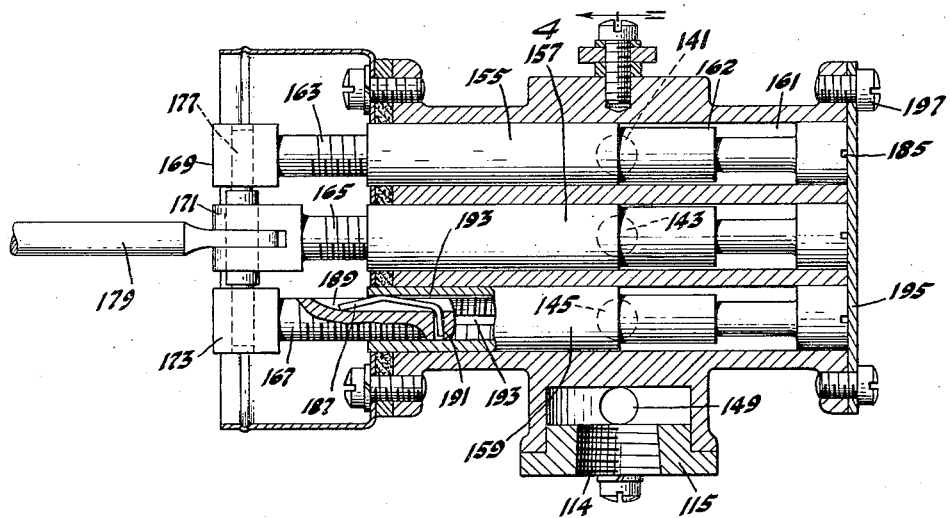
Fig. 3 is a longitudinal section through the selector valve on line 3—3 of Fig. 4.
Figure 4:
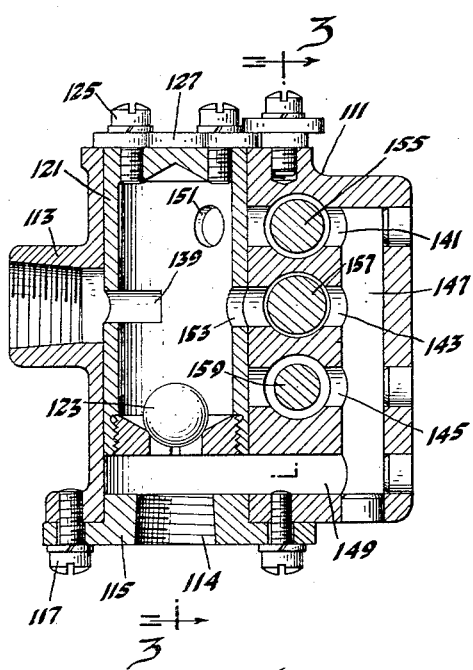
Fig. 4 is a section substantially on line 4—4 of Fig. 3.

For the purpose of making individual adjustments of the three valve rods of the selector valve, each rod has a slotted end as at 185. The rotation of the rod is normally prevented by a spring 187 located in a slot 189 and a hole 191 in the rod extension as shown in Fig. 3. The valve rods are themselves provided with grooves as at 193 into which the spring 187 is received. This spring, carried by the rod extension and received in a groove of the rod proper, prevents any relative rotation of the rod and its extension under normal conditions. Positive rotation of the rod by a tool entered in the slot 185 easily overcomes the spring pressure and permits the adjustment of the rod relative to the rod extension. Access for this adjustment may be provided by a cover 195 held by two fastening means 197, one of which may be released to permit the cover to swing about the other fastening means.

It has been explained that the upper and lower apertures in the hollow cylinder 121 control the rate of clutch engagement for high speed and second speed respectively. The middle aperture is the one which is operative when the shift rod for second and high speeds is in its neutral position. Since the shift rod for low and reverse is not connected to the selector valve it will be understood that the retardation effected by the middle valve rod 157 controls the reengagement of the clutch when shifting into low or reverse speeds.

In Fig. 7 is shown a modified form wherein a valve member having the function of the selector valve is located in a detached relation and not in series with the other valves as was the case in the preferred form. In this form of the invention the manifold is in communication with the power unit by means of a conduit within which are the master and control valves as before. The selector valve is modified and simplified. It is differently connected to the power unit and has no mechanical connection with the clutch-operating mechanism. Also, the power unit is modified to conform with the modified structure and position of the selector valve.

The power unit is represented by numeral 201. In this form it is shown as provided with a movable element such as a reciprocating piston 203. An opening at 205 is provided at the right of the piston for connection with the conduit 77 leading to the manifold by way of the master and control valves. On the other side of the piston an opening 207 is provided for connection with a conduit 209 leading to an opening 211 of the modified selector valve. On the same side of the piston of the power unit is a one-way valve 213 normally held closed by a spring 215. The piston 203 has a rod 217 which is intended to be connected to the equivalent of lever 63 of the form first described, so that when suction is developed on the right side of the piston the lever is rocked and the clutch opened as before. This movement of the piston is made possible by the admission of air through the opening of valve 213. The piston rod is, for a portion of its length, provided with an axial bore terminating with openings 219 and 221, one of these openings being normally within and the other normally without the power unit to thereby permit air from the atmosphere to enter the power cylinder on the left side of the piston.

The selector valve 223 has rotatably mounted therein a hollow cylinder valve member 225. This valve member has its lower end open to the inlet opening at 211. Its top is closed and carries a lever arm 227 which is to be connected by a link in all respects like link 137 of the form first described to the same sort of mechanism controlled by the reciprocation of the shift rod for high and second speed driving. The valve 225 has three openings 229, 231, and 232 as shown in the figure. These openings communicate, as the valve is rotated, with openings 233, 235, and 237 in the wall of the valve body 223. The several openings last mentioned are variably controlled by adjustable plugs 239, 241, and 243, there being openings to the air at 245, 247, and 249. When the master and control valves are so located as to develop suction in the power unit, the piston moves to the right, air entering the left side of the piston freely by way of the valve 213. However, after a shift has been made and the accelerator pedal is depressed air flows into the power unit at the right side of the piston 203 tending to move it to the left. At once the valve 213 closes so that it has no part in releasing the air from the left side of the piston. The outflow of air through the hollow rod 217 makes the movement of the piston rapid until the inner opening 221 is closed by the walls of the power unit. When thus the escape of air through the piston rod is prevented, the air must escape wholly through the selector valve. The escape of air through the selector valve is variably determined by the particular opening of the valve member 225 which is in registration with the opening in the wall of the valve body 223 and also by the adjustment of the several plugs 239, 241, and 243. It will therefore be seen that with this arrangement there is a controlled dashpot resistance to the engagement of the clutch plates after a comparatively free and unrestricted movement of the clutch plate toward engagement. This form of the invention is somewhat similar to the first which first form is now believed to be preferable, although in some installations the second may afford a satisfactory operation.

We claim:

1. In combination, an engine having a fuel inlet and a throttle valve, a first manually operable member movable to control said valve, clutch operating means to connect said engine to driven mechanism, a vacuum cylinder, a movable element therein connected to said clutch operating means, a conduit from said cylinder to said fuel inlet whereby, when said conduit is unvented the engine suction may move said movable element and release said clutch, and means controlled by said first manually operable member when in throttle open position to vent the passage through the conduit to the cylinder and permit the closure of said clutch, together with a second means normally venting said conduit and located relatively nearer the engine inlet and a second manually operable means movable to close said second mentioned vent and open the conduit, each of said venting means comprising a cylinder having openings in its walls communicating with portions of the conduit, said cylinders having a communicating passage therebetween, a valve rod reciprocable in each of said cylinders, each valve rod having at one portion thereof an annular groove whereby uninterrupted flow through the conduit may occur and in another portion a wall to close the passage through the conduit to the fuel inlet and a recess to open to the atmosphere the passage to the cylinder.

2. In combination, an engine having a fuel inlet and a throttle valve, a first manually operable member movable to control said valve, clutch operating means to connect said engine to driven mechanism, a vacuum power cylinder comprising a chamber and a movable element therein, connecting means between said movable element and said clutch operating means, a conduit from said cylinder to said fuel inlet whereby, when said conduit is unvented, the engine suction may move said movable element and release said clutch, means controlled by said first manually operable member when in throttle open position to vent the passage through the conduit to the cylinder and permit closure of the clutch, together with second means normally venting said conduit and located nearer the engine inlet, and a second manually operated means movable to close said second mentioned vent together with a selector valve having a part movable to a plurality of positions to provide a plurality of rates of flow to said cylinder from said vent openings.

3. The invention defined by claim 2 and a change speed transmission, a member movable therein to effect a plurality of speed ratios, a connection therefrom to said selector valve whereby the rate of venting depends upon the position of the gear shift mechanism.

4. The invention defined by claim 2, said selector valve being in series with said other valves in said conduit and located relatively near the power cylinder and having means to permit unrestricted flow in a direction from the power cylinder toward the vent openings.

5. The invention defined by claim 2, said selector valve being in series with said other valves in said conduit and located relatively near the power cylinder and having means to permit unrestricted flow in a direction from the power cylinder toward the vent openings, said selector valve having a plurality of passages therethrough, one operable with each position of adjustment, and a plurality of movable valve members, one controlling each passage, each valve member shaped to variably restrict the passage in different positions of its movement, said valve members being each connected to said clutch-operating means whereby the clutch as it moves to engagement may move with comparative freedom at first but be restricted as it moves into active position.

6. The invention defined by claim 2, said selector valve being in series with said other valves in said conduit and located relatively near the power cylinder and having means to permit unrestricted flow in a direction from the power cylinder toward the vent openings, said selector valve having a plurality of passages therethrough, one operable with each position of adjustment, and a plurality of movable valve members, one controlling each passage, each valve member shaped to variably restrict the passage in different positions of its movement, said valve members being each connected to said clutch-operating means whereby the clutch as it moves to engagement may move with comparative freedom at first but be restricted as it moves into active position, and means to independently adjust said valve members.

7. The invention defined by claim 2, a second and independent conduit connecting said selector valve with the cylinder on that side of the movable element opposite the connection for the vacuum conduit, said cylinder having a valve to provide a free air inlet on the selector valve side of the piston and to prevent escape of air therefrom, and mechanism associated with said movable element to permit free passage of air to and from said side for a part of the movement of said movable element.

8. The invention defined by claim 2, a second and independent conduit connecting said selector valve with the cylinder on that side of the movable element opposite the connection for the vacuum conduit, said cylinder having a valve to provide a free air inlet on the selector valve side of the movable element and to prevent escape of air therefrom, and mechanism associated with said movable element to permit free passage of air to and from said side for a part of the movement of said movable element, said selector valve having a plurality of venting passages and individual adjusting means for each passage.

9. The invention defined by claim 2, a second and independent conduit connecting said selector valve with the cylinder on that side of the movable element opposite the connection for the vacuum conduit, said cylinder having a valve to provide a free air inlet on the selector valve side of the movable element and to prevent escape of air therefrom, and mechanism associated with said movable element to permit free passage of air to and from said side for a part of the movement of said movable element, together with change speed mechanism and means associated therewith movable to effect a plurality of speed ratios, and a connection from said movable member to said selector valve.

10. In a power operated clutch control mechanism for an automotive vehicle provided with a clutch and a throttle, a control valve unit for said mechanism comprising a ported casing member, said casing member provided with two parallel juxtaposed bores extending lengthwise of the casing and further provided with a cross bore intercommunicating said aforementioned bores at one end thereof, mutually cooperating reciprocable valve members slidable within said first mentioned bores, said slidable valve members being recessed to provide, with said bores, two three-way valves and manually operable means for operating said throttle and valve members.

GEORGE C. CARHART.
JOHN P. HEISS.
AXEL J. JANSSON.